May 31, 1955    W. H. BIXBY    2,709,779
VOLTAGE REGULATING SYSTEM
Filed Aug. 11, 1953
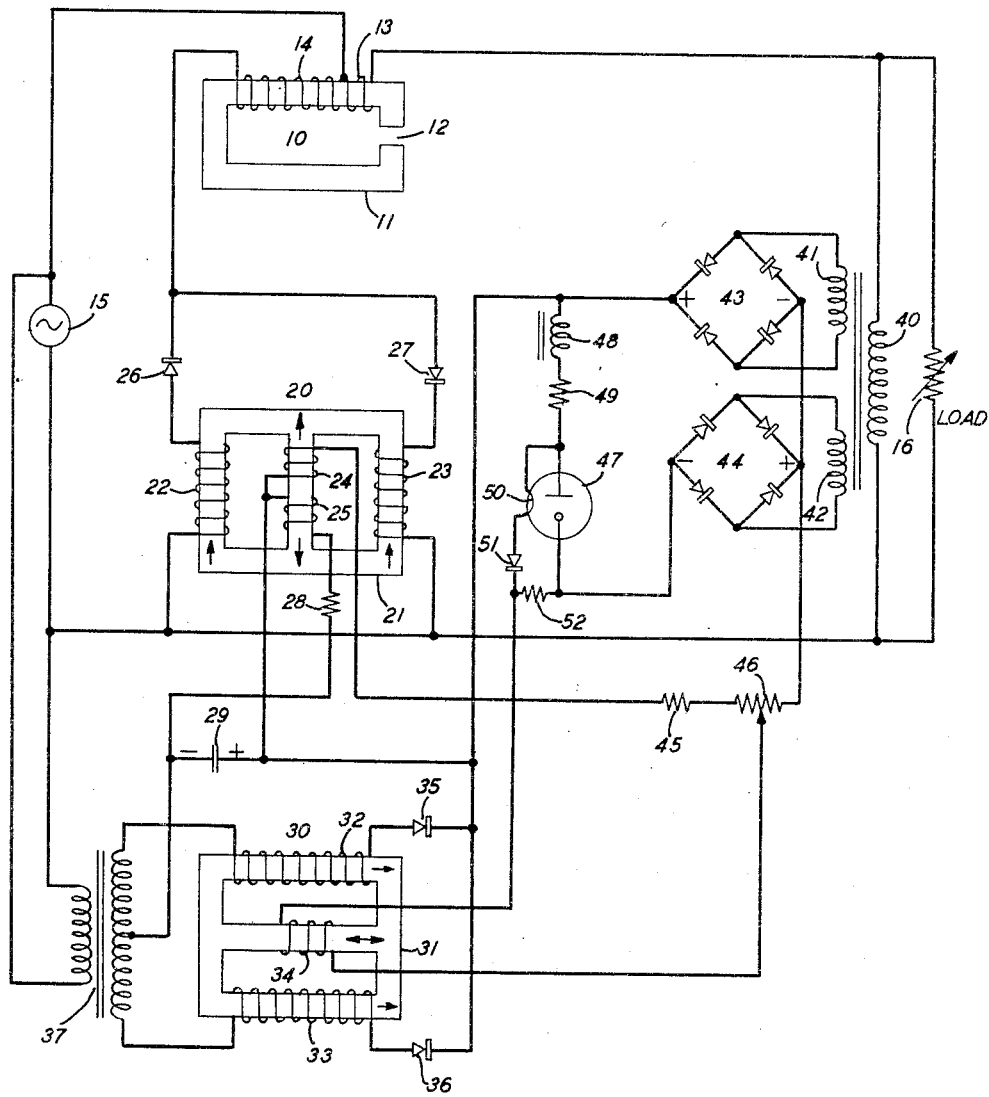
INVENTOR
W. H. BIXBY
BY
ATTORNEY

United States Patent Office 2,709,779
Patented May 31, 1955

2,709,779

VOLTAGE REGULATING SYSTEM

William H. Bixby, Detroit, Mich., assignor to Donald R. Middleton and Stanley M. Hanley, doing business as Power Equipment Company, Detroit, Mich., a copartnership Application August 11, 1953, Serial No. 373,559

6 Claims. (Cl. 323—66)

This invention relates to current supply apparatus and particularly to apparatus for regulating the supply of current from an alternating-current supply source, the voltage of which may vary, to a load to maintain the load voltage substantially constant.

An object of the invention is to provide an improved alternating-current line voltage regulator.

Another object is to provide an alternating-current line voltage regulator having a high input power factor and a high efficiency.

Other objects are to provide an alternating-current line voltage regulator requiring relatively small control power for operation and to provide a relatively simple control circuit for supplying the control power.

A known type of alternating-current line voltage regulator comprises a buck-boost autotransformer and a saturable reactor having an alternating current or impedance winding and a control or saturating winding to which current is supplied to control the saturation of the reactor core and thus the impedance of the alternating-current winding. Alternating current from a supply source is supplied through a first or series portion of the autotransformer to a load. Alternating current is also supplied from the supply source through a second or shunt winding portion of the autotransformer winding and the alternating current reactor winding in series. A direct current which varies in response to changes of load current or voltage is supplied to the control winding of the saturable reactor to control the current in the shunt winding portion of the autotransformer and thereby to set up across the series winding portion of the autotransformer a bucking or boosting voltage which is added vectorially to the input or line voltage to cause the load current or voltage to be regulated. Regulators of this type are disclosed, for example, in United States Patents 1,843,745 to L. W. Thompson, February 2, 1932; 2,568,172 to H. H. Spencer, September 18, 1951; and 2,563,486 to J. A. Potter, August 7, 1951.

The practice has been to operate voltage regulators of this type with the output or load voltage very nearly equal to the nominal or mean value of the input or line voltage so that the control current supplied to the control winding of the saturable reactor can be varied to prevent the appearance of line voltage variations in the output or load voltage. When the line voltage is less than its mean value, the saturable reactor is placed in a saturated condition by the current in the control winding so that the voltage drop across the reactor is relatively low and the buck-boost transformer raises the output voltage above the input voltage. When the line voltage is higher than the mean value, the saturable reactor is placed in an unsaturated condition by the current in the control winding so that the voltage drop across the reactor is relatively high and the buck-boost transformer lowers the output voltage below the input voltage.

In the design of such regulators, harmonic filters are frequently connected across the buck-boost transformer, as shown in the Potter patent, supra, to suppress the third and higher harmonic voltage components appearing across the saturable reactor to thereby improve the wave shape of the output voltage. These filters, being of the series resonant type, draw considerable capacitive reactive current at the fundamental frequency of the supply voltage. The effective capacitance so introduced, if not compensated, will produce a series resonant condition with the saturable reactor across the input line under the proper condition of saturation of the reactor, thereby introducing an undesirable operating point into the saturation range. To compensate for this effective capacitance, the buck-boost transformer is provided with a non-magnetic gap in its magnetic circuit of sufficient length to reduce the inductive reactance at fundamental frequency, measured across the end terminals of its winding, to a value equal to or slightly less than the total effective capacitive reactance of these filters. With this compensation, no series resonance can occur so that no undesirable points are present in the operating range.

In the known voltage regulators, as described above, the buck-boost transformer, together with the harmonic filters, acts as a current transformer at the fundamental frequency of the supply source. The line current thus divides so that the current portion flowing through the saturable reactor is related to the current portion flowing through the load inversely as the turns in the respective portions of the buck-boost transformer through which the portions, respectively, of the current flow. By operating the buck-boost transformer at high flux densities, the consequent magnetizing current required can be made to materially reduce the current through the saturable reactor at high input voltages, but over the major portion of the line voltage range the current division will be as described above.

The voltage regulator, as described above, has certain disadvantages. One disadvantage is that the power required to be supplied to the control or saturating winding of the saturable reactor is so large that a power amplifier of large size is required to raise the power level of the control voltage derived from the load circuit to the level required in the saturating winding. This power requirement, added to the losses in the amplifier, reduces the realizable efficiency of the regulating unit a considerable amount. Another disadvantage is that the action of the buck-boost transformer, in requiring the current division as described above, together with the considerable voltages appearing across the saturable reactor, makes necessary supplying large amounts of reactive and distortion power to the saturable reactor from the input line. This reactive and distortion power adds to the apparent power required to be supplied from the supply line, thereby reducing the input power factor. A third disadvantage is that the necessity for supplying magnetizing current for the saturable reactor and the buck-boost transformer, particularly under high input line voltage conditions, requires the addition of considerable inductive reactive load in shunt with the regulator output. The effect of this additional load is to still further reduce the input power factor and overall efficiency.

These and other disadvantages are overcome by designing a line voltage regulator in accordance with the invention a specific embodiment of which is herein shown and described for the purpose of illustration. In accordance with the invention, there is provided an autotransformer comprising a core forming a flux path partly of magnetic material and partly of a gap or gaps devoid of magnetic material and a winding on the core having a first or series winding portion through which alternating current from a supply source is supplied to a load and a second or shunt winding portion having a larger number of turns than the series portion. There is also provided a saturable reactor having a three-legged core of magnetic material, an impedance or power winding on each of the outer legs of the core and a biasing winding and a control winding on the middle leg of the core. Pulsating unidirectional current is supplied from the supply source through each of the impedance windings, current being supplied through a current path comprising one of the impedance windings, a rectifying element and the shunt portion of the autotransformer winding during half-cycle periods of one polarity of the supply source and through a current path comprising the other impedance winding, a second rectifying element and the shunt portion of the autotransformer winding during half-cycle periods of opposite polarity. Unidirectional currents derived from the load circuit are supplied to the biasing and control windings, respectively, of the saturable reactor to set up opposed magnetomotive forces in the middle leg of the reactor core. When the line voltage is at a maximum value, for example, the resultant of these opposed magnetomotive forces has a direction which opposes the magnetomotive forcees due to the currents flowing in the impedance windings of the saturable reactor and the alternating current flowing through the shunt portion of the autotransformer winding is small. When the line voltage is at a minimum value, for example, the resultant of the magnetomotive forces due to currents in the biasing and control windings of the saturable reactor has a direction which aids the magnetomotive forces due to currents flowing in the impedance windings, thereby saturating the outer legs of the core and increasing the alternating current flowing through the shunt portion of the autotransformer winding.

The gap or gaps in the flux path of the autotransformer core is of sufficient length, that, when the maximum current is being supplied to a load having a high power factor which may be substantially unity and when the circuit for supplying current through the shunt winding portion of the autotransformer is interrupted, the voltage across the load is reduced below the voltage of the supply source by only a small amount, say, not more than five per cent. The regulating circuit is designed and adjusted so that the impedance windings of the saturable reactor have a certain maximum impedance to allow sufficient current to flow through the shunt portion of the autotransformer winding to cause the load voltage to be increased to a value at least as large as the maximum voltage of the supply source. The load voltage is equal to the vector sum of the supply source voltage and the voltage across the series portion of the autotransformer winding. The length of the series gap or gaps in the flux path of the autotransformer may be adjusted before connecting the autotransformer into the regulating circuit. This is done by impressing across the series portion only of the autotransformer an alternating voltage which is required to be added vectorially to the minimum value of line voltage to raise the load voltage to its operating value equal to or somewhat greater than the maximum line voltage and adjusting the length of the series gap or gaps so that the current flowing through the series portion of the autotransformer winding is equal to the maximum current which is to be supplied to the load. When the load current has a predetermined value, which may be the maximum load current, and the load voltage is substantially constant, the relationship of the current supplied to the shunt winding portion of the autotransformer and the difference between the load voltage and the supply voltage is substantially rectilinear over the entire range of supply voltage.

Current is supplied through a resistive path to the biasing winding of the saturable reactor from a full wave rectifier to which alternating current is supplied from the load circuit. Since the alternating load voltage has a nearly constant amplitude, the amplitude of the unidirectional current supplied to the biasing winding is also substantially constant. Unidirectional current is supplied through a resistor to the control winding of the saturable reactor from a single stage magnetic amplifier. This current is caused to vary in response to load voltage changes by controlling the current supplied to a control winding of the magnetic amplifier. There is derived from the load circuit by means of a rectifier a unidirectional voltage having variations corresponding to load voltage changes and there is also set up a substantially constant reference voltage across a constant voltage device to which energizing current is supplied from the load circuit. These two component voltages in opposed relationship are impressed upon a current path comprising the control winding of the magnetic amplifier through which current flows in one direction or the other depending upon which of the two component voltages is the larger. The control circuit is provided with an asymmetrically conducting varistor and a resistor in series in a current path across the constant voltage device so connected that the current flowing in one direction through the control winding of the magnetic amplifier flows through the varistor in its forward or low resistance direction and current flowing in the other direction through the control winding flows through the resistor which prevents the flow of excessive current in this direction should the load voltage increase to an excessively high value due to an abnormal operating condition.

The invention will now be described with reference to the accompanying drawing the single figure of which is a schematic view of a current supply apparatus embodying the invention.

Referring to the drawing, there is provided an autotransformer 10 comprising a core 11 of magnetic material forming a flux path having therein a series gap or gaps 12 devoid of magnetic material, the gap or gaps being adjusted to a predetermined length as will later be described. A winding on the core comprises a series portion 13 which is connected in series with an alternating-current supply source 15 and a load 16 which may vary and a shunt portion to which is supplied from the supply source 15 alternating current the amplitude of which is controlled in response to load voltage changes. The winding portion 14 has a larger number of turns than the winding portion 13. For example, the series portion 13 may have 36 turns and the shunt portion 14 may have 90 turns. The length of the series gap 12 may be adjusted, before the autotransformer 10 is installed in the regulating circuit, by connecting across the winding portion 13 an alternating voltage equal to or slightly greater than the difference between the maximum and minimum voltages of the supply source 15 and increasing or decreasing the gap length until the current through the winding portion 13 is equal to or slightly greater than the maximum root-mean-square load current. For example, there may be impressed across the series winding portion 13 sixty volts at sixty cycles per second and the series gap adjusted to give a current of about fifty-four amperes through the winding portion 13.

There is provided a saturable reactor 20 comprising a three-legged core 21 of magnetic material, impedance or power windings 22 and 23 of substantially equal turns on the outer legs, respectively, of the core, and, on the middle leg of the core, a biasing winding 24 and a control winding 25. Windings 22 and 23 may each have 184 turns, winding 24 may have 1500 turns and winding 25 may have 1500 turns, for example. During half-cycle periods of one polarity of a supply source 15, current is supplied from the source to a current path comprising winding 22, an asymmetrically conducting varistor 26 in its forward or low resistance direction, and the shunt winding portion 14 of autotransformer 10, all in series. During half-cycle periods of opposite polarity, current is supplied from the source 15 to a current path comprising winding portion 14, an asymmetrically conducting varistor 27 in its forward direction and the winding 23, in all series. Alternating current is thus supplied through winding portion 14 and pulsating unidirectional current is supplied to each of windings 22 and 23. The currents supplied to windings 22 and 23, respectively, cause to be set up in a magnetic circuit including the outer legs of the core 21 magnetomotive forces having opposite directions, as indicated by the arrows on the drawing. The currents supplied to the windings 24 and 25, respectively, on the middle leg, as will be described, set up magnetomotive forces which are opposed, as indicated by the arrows. In operation, the resultant of the magnetomotive forces due to the windings 24 and 25 may be zero or may either aid or oppose the magnetomotive forces due to windings 22 and 23 depending upon whether the magnetomotive force due to winding 25 is larger or smaller than the magnetomotive force due to winding 24. A resistor 28 of 50 ohms, for example, is connected in series with the control winding 25 and a commutating condenser 29 of 20 microfarads, for example, is connected across winding 25 and resistor 28 in series.

There is provided a magnetic amplifier 30 for controlling the supply of rectified current from supply source 15 to the control winding 25. The amplifier comprises a saturable reactor having a three-legged core 31 of magnetic material with impedance or power windings 32 and 33 on the outer legs, respectively, of the core and a control winding 34 on the middle leg. Windings 32 and 33 may each have 568 turns and winding 34 may have 2500 turns, for example. There is provided a transformer 37 having a primary connected to the supply source 15 and a secondary winding having a mid-terminal. During half-cycle periods of one polarity of the supply source, current is supplied from the upper portion of the secondary of transformer 37 to a circuit comprising reactor winding 32, an asymmetrically conducting varistor 35 in its forward direction, winding 25 and resistor 28, all in series. During half-cycle periods of opposite polarity, current is supplied from the lower portion of the secondary of transformer 37 to a circuit comprising reactor winding 33, an asymmetrically conducting varistor 36 in its forward direction, winding 25 and resistor 28, all in series. The resistor 28 lowers the time constant of the circuit for supplying current to control winding 25 and thereby improves the response of this circuit to sudden current changes.

There is connected across the load 16 the primary winding 40 of a transformer having two secondary windings 41 and 42. Winding 41 is connected to the input terminals of a full wave bridge rectifier 43 and winding 42 is connected to the input terminals of a full wave bridge rectifier 44. The voltage of the supply source 15 may be 208 volts plus or minus 10 per cent, the voltage across the load 16 may be adjusted to a value within a range from 230 to 242 volts and the voltage across each half of the secondary of transformer 37 may be 105 volts, for example. When the load voltage is 242 volts, the voltages across secondary transformer windings 41 and 42 may be 82 volts and 124 volts, respectively, for example. Current is supplied from the output terminals of rectifier 43 to a circuit comprising biasing winding 24, a resistor 45 of 200 ohms, for example, and a potentiometer 46 having a resistance of about 70 ohms for example, all in series. There is provided a cold cathode, gas-filled, constant voltage device 47 to which energizing current is supplied from the rectifiers 43 and 44 in series to set up across the tube 47 a substantially constant voltage of 105 volts, for example. The energizing circuit may be traced from the positive terminal of rectifier 43 through an inductive reactor 48, a resistor 49 of 1250 ohms, for example, to the anode of constant voltage tube 47, from the cathode of tube 47 to the negative terminal of rectifier 44 and from the positive terminal of rectifier 44 to the negative terminal of rectifier 43. The inductive reactor 48 is provided to prevent interruption of current conduction through the tube 47 due to the cyclic variation of the voltage from rectifiers 43 and 44. The resistance of resistor 45 and that of potentiometer 46 in the circuit for supplying current to biasing winding 24 decreases the time constant of this circuit to improve its response to sudden current changes. A shunt current path connecting the anode and cathode of tube 47 comprises a conductor 50 within the tube 47, an asymmetrically conducting varistor 51 and a resistor 52 of 10,000 ohms, for example, all in series, the conductor 50 being provided within the tube 47 to open the shunt current path when tube 47 is removed from its socket. The varistor 51 is poled so that its resistance is low to current flowing in the shunt path in the direction from the anode to the cathode of tube 47. The common terminal of varistor 51 and resistor 52 is connected to one terminal of control winding 34 and the adjustable contact of potentiometer 46 is connected to the other terminal of winding 34.

The output voltages of rectifiers 43 and 44 each increase in response to an increase of load voltage, and vice versa, and this is also true of the voltage across the portion of potentiometer 46 which is in series with the control winding 34. When the load voltage has a certain predetermined value, the sum of the output voltage of rectifier 44 and the voltage across the portion of potentiometer 46 which is in series with winding 34 is equal to the voltage across constant voltage tube 47. For this condition no current flows through the circuit comprising winding 34. When the load voltage decreases with respect to the predetermined value, current flows from the positive terminal of rectifier 43 through inductive reactor 48, resistor 49, varistor 51 in its forward direction, winding 34 and through a portion of potentiometer 46 to the negative terminal of rectifier 43. When the load voltage increases above the predetermined value, current flows from the positive terminal of rectifier 44 through a portion of the potentiometer 46, winding 34 and resistor 52 to the negative terminal of rectifier 44. Under this condition the varistor 51 substantially prevents current flow therethrough in its reverse direction and the resistor 52 limits the current flow through the winding 34 in case the load voltage is increased to an abnormally high value as might occur due to a sudden application of abnormally high line voltage or due to the sudden removal of a rather large load. Under normal conditions, the regulator operates in response to an increase of load voltage to minimize the load voltage increase but, under the abnormal condition referred to, if the resistor 52 and varistor 51 were not provided to limit the current in the winding 34, the large change of current through the winding 34 would cause the regulator to further increase the load voltage, as will be explained below.

The operation of the regulator may be explained by first considering that the load voltage has a predetermined initial value such that the average value of the pulsating voltage between the negative terminal of rectifier 44 and the variable contact of potentiometer 46 is equal to the constant voltage across the constant voltage tube 47 so that no average current flows through the winding 34. Then, if the load voltage decreases with respect to the predetermined value, current will flow through winding 34 in a direction to set up in the core 31 a magnetomotive force which aids the magnetomotive forces set up in the core due to the rectified currents flowing through windings 32 and 33, respectively. The impedances of windings 32 and 33 will thus decrease to cause the currents in these windings to increase, thereby further decreasing the impedances of these windings and further increasing the currents flowing through these windings. The control winding 25 on the middle leg of core 21 is connected in series with the windings 32 and 33 so that increased current also flows through winding 25. If it is assumed, for the purpose of explanation, that the magnetomotive forces due to the currents supplied to windings 24 and 25, respectively, are equal when the load voltage is at the predetermined initial value, then the increased current supplied to winding 25 will cause the magnetomotive force due to this winding to increase by a relatively large amount and at the same time the magnetomotive force due to the current from rectifier 43 supplied to winding 24 will decrease by a relatively small amount. Therefore, the resultant of the magnetomotive forces due to windings 24 and 25 will have a direction such as to aid the magnetomotive forces due to the currents supplied to windings 22 and 23. The impedance of each of windings 22 and 23 is therefore decreased to cause an increase of the unidirectional currents flowing through these windings and thereby further decrease the impedances of these windings and further increase the currents through these windings. As a result, the alternating current flowing through the shunt portion 14 of the autotransformer winding is increased to change the magnitude and phase of the voltage across the series portion 13 of the autotransformer so as to minimize the assumed decrease of load voltage, the load voltage being equal to the vector sum of the voltage of source 15 and the voltage across the series portion 13 of the autotransformer winding.

If the load voltage increases to a value such that the sum of the output voltage of rectifier 44 and the voltage across a portion of potentiometer 46 has a larger average value than the voltage across the constant voltage tube 47, current flows through the winding 34 in such a direction that the magnetomotive force due to this winding opposes the magnetomotive forces due to the windings 32 and 33. The magnetomotive force due to winding 34 is smaller than each of the magnetomotive forces due to windings 32 and 33. Therefore, the impedances of windings 32 and 33 are increased and the current flow through these windings and through the winding 25 is reduced. The resultant of the magnetomotive forces due to windings 24 and 25 therefore has a direction opposed to the magnetomotive forces due to windings 22 and 23, thus causing the impedances of windings 22 and 23 to increase. The alternating current flowing through winding portion 14 is thus reduced and the magnitude and phase of the voltage across the series portion 13 of the autotransformer winding changes so as to minimize the assumed rise of load voltage.

It is seen that, when the sum of the output voltage of rectifier 44 and the voltage across a portion of potentiometer 46 has an average value larger than the opposing voltage across constant voltage tube 47, the current flowing through winding 34 is limited by the resistor 52, the reverse current flow through varistor 51 being negligibly small. This current limitation is such that the magnetomotive force set up by the current in winding 34 is less than the opposing magnetomotive forces due to windings 32 and 33 even if the load voltage should rise to an abnormally high value. If this current limitation feature were not provided and, as a result, the magnetomotive force due to winding 34 should become greater than the opposing magnetomotive forces due to windings 32 and 33, the impedances of windings 32 and 33 would decrease, the current through winding 25 would increase and the impedances of windings 22 and 23 would decrease. In that case, the rise of load voltage would cause an increase of current through the shunt portion 14 of the autotransformer and thus produce a further increase of load voltage.

The regulator circuit is designed so that the load voltage is substantially as large as or, preferably, somewhat larger than the maximum voltage of the supply source 15. The load voltage may be adjusted by means of the potentiometer 46. An increase of the portion of the potentiometer resistance which is included in series with the winding 34 produces a decrease of load voltage and vice versa.

The use of rectifying elements 26 and 27 to rectify the currents supplied through windings 22 and 23 to make the reactor 20 self-saturating results in a reduction of the control power required to be supplied to the control winding 25. A relatively small amplifier may therefore be used for amplifying a control current derived from the load circuit to the level required to be supplied to the control winding 25. When using the rectifying elements to make the saturable reactor self-saturating, satisfactory results cannot be obtained when a conventional buck-boost autotransformer is used instead of the autotransformer 10, as described above, for the following reason. The buck-boost transformer acts as a current transformer at the fundamental frequency, the line current dividing so that the ratio of the current through the shunt winding portion 14 to the load current through the series winding portion 13 is substantially equal to the ratio of the turns of the series portion 13 to the turns of the shunt portion 14. Therefore, for any fixed value of load current, the current through the shunt winding portion 14 will remain approximately constant. At full load current, the current through the shunt winding portion 14 and the currents through the impedance windings 22 and 23 of the saturable reactor will be large and the core 21 will be strongly saturated. This strong self-saturating action produced by the large currents in windings 22 and 23 makes it impossible for the resultant magnetomotive force due to the bias winding 24 and the control winding 25 to unsaturate the core when the supply voltage 15 is high, as would be required in order to buck the supply voltage in the buck-boost transformer and thus reduce the load voltage to the mean value of the supply voltage. Thus, regardless of how low the value of the control current in winding 25 is made, or how high the value of the bias current in winding 24 is made, the voltage across the reactor windings 22 and 23 cannot be increased to a sufficiently high value to give the desired load voltage even though ample voltage control margin is provided for light load conditions.

The above difficulty is overcome, in accordance with the invention, by including in the flux path of the autotransformer 10 a series non-magnetic gap 12 of sufficient length, as previously described. Then the full load current can be supplied through the series winding portion 13 with only a slight reduction of load voltage below the voltage of the supply source 15 when no current is being supplied through the shunt winding portion 14. The regulating circuit is operated with sufficient current flowing through shunt winding portion 14 so that the autotransformer 10 always functions to boost the load voltage to a value substantially equal to or greater than the maximum supply voltage. At maximum supply voltage, the current through the shunt winding portion of autotransformer 10 is relatively small even at maximum load current.

The reduction of the control power required has made possible the relatively simple circuit shown and described for supplying the control power to the saturable reactor 20. The improved input power factor has made possible a reduction in size of the power components with a consequent improvement in efficiency of operation. Illustrative operating data obtained with the regulating circuit shown and described when loaded with about 12,500 volt-amperes at unity power factor is as follows:

| Input Voltage | Current in Shunt Winding 14 | Load Voltage | Input Power Factor | Overall Efficiency |
|---|---|---|---|---|
| Volts | Amperes | Volts | | |
| 187.2 | 21.5 | 228.0 | 0.939 | 0.969 |
| 208.0 | 13.9 | 230.0 | 0.932 | 0.975 |
| 228.8 | 6.0 | 234.5 | 0.940 | 0.976 |

Instead of providing a three-legged core 21, the saturable reactive device 20 could comprise two cores. The winding 22 would be wound on one of the cores, winding 23 would be wound on the other of the cores and each of windings 24 and 25 would be wound on both cores. For example, one half of each of windings 24 and 25 would be wound on one of the cores and the remaining half of each of windings 24 and 25 would be wound on the other of the cores. The saturable reactive device 30 could be similarly modified by placing winding 32 on one core, the winding 33 on another core, a half portion of winding 34 on the one core and the remaining half portion of winding 34 on the other core.

What is claimed is:

1. Apparatus for supplying to a load having a high power factor which may be substantially unity from an alternating-current supply source the voltage of which may vary over a range from a certain minimum to a certain maximum value alternating current having a certain maximum root-mean-square value comprising an autotransformer having a core forming a flux path partly of magnetic material and partly of a series gap or gaps devoid of magnetic material and having a winding on said core comprising a first and a second winding portion, means for connecting said first winding portion in series with said load and said source, said gap or gaps being of sufficient length that when said maximum load current flows through said first winding portion and said load in series and when zero current flows through said second winding portion the voltage across said load is reduced below said supply source voltage by only a few per cent, saturable reactive means comprising a first and a second winding and a winding means, a first and a second rectifying element, means for supplying current from said supply source during half-cycle periods of one polarity thereof to a current path comprising said first winding, said first rectifying element and said second winding portion of said autotransformer all in series to set up a first unidirectional magnetomotive force in a magnetic circuit for said first winding means for supplying current from said supply source during half-cycle periods of opposite polarity thereof to a current path comprising said second winding, said second rectifying element and said second portion of said autotransformer winding all in series to set up a second unidirectional magnetomotive force in a magnetic circuit for said second winding, means for energizing said winding means from said supply source to set up a third magnetomotive force in each of said magnetic circuits and means responsive to a decrease of load voltage for changing the energization of said winding means to change said third magnetomotive force in a direction to reduce the impedance of said first and second windings of said saturable reactive means, thereby increasing the current flowing through said second winding portion of said autotransformer to minimize said decrease of load voltage and vice versa, said first and second windings having a certain maximum impedance to allow sufficient current to flow through said second winding portion of said autotransformer to cause said load voltage to be increased to a value at least as large as the maximum voltage of said supply source.

2. A combination in accordance with claim 1 in which said second portion of said autotransformer winding has a larger number of turns than the turns of said first winding portion.

3. A combination in accordance with claim 1 in which the energization of said winding means changes to change said third magnetomotive force over an operating range extending from a magnetomotive force which opposes the magnetomotive forces set up by the currents in said first and second windings to a magnetomotive force which aids the magnetomotive forces set up by the currents in said first and second windings.

4. Apparatus for supplying current from an alternating-current supply source the voltage of which may vary to a load circuit including a load comprising a core forming a flux path partly of magnetic material and partly of a series gap or gaps devoid of magnetic material, a winding on said core having a first and a second winding portion, said second winding portion having more turns than said first winding portion, means for connecting said first winding portion in series with said supply source and said load circuit, a saturable reactive means having a first and a second winding for setting up magnetomotive forces in a first and a second magnetic circuit respectively, and having a third and a fourth winding means, a first and a second rectifying element, a first current path comprising said first winding and said first rectifying element in series, a second current path comprising said second winding and said second rectifying element in series, means for connecting said first and second current paths in parallel with respect to each other and in series with said second winding portion and said current supply source, said rectifying elements being poled to cause current flow through said first and second current paths during alternate half-cycle periods of said supply source respectively, means for deriving from said load circuit and supplying to said third winding means current for setting up a unidirectional magnetomotive force in said magnetic circuits and means for deriving and supplying to said fourth winding means a unidirectional current which varies in response to load voltage changes and having a rate of change which is high with respect to the rate of change of said load voltage, the current supplied to said fourth winding means setting up in each of said magnetic circuits a magnetomotive force which is opposed to the magnetomotive force set up due to the current supplied to said third winding means and which may vary in response to load voltage changes over a range including values above and below the magnetomotive force set up due to current supplied to said third winding means.

5. Apparatus for controlling the supply of alternating current from a supply source to a load to minimize changes of alternating voltage across said load comprising a first core partly of magnetic material and partly of a series gap or gaps devoid of magnetic material, a first winding on said first core having a first and a second winding portion, said second winding portion having a larger number of turns than said first winding portion, a second core of magnetic material having two outer legs and a middle leg, a second and a third winding on said outer legs respectively and a fourth and a fifth winding on said middle leg, a first and a second rectifying element, means for supplying current from said source during half-cycle periods of one polarity thereof to a current path comprising said second winding, said first rectifying element and said second winding portion in series, means for supplying current during half-cycle periods of opposite polarity thereof to a current path comprising said third winding said second rectifying element and said second winding portion in series, a first transformer having a primary winding connected across said load and two secondary windings, a first and a second bridge rectifier each having a pair of input terminals and positive and negative output terminals, said pairs of input terminals being connected to said secondary windings respectively, means for conductively connecting the negative output terminal of said first rectifier to the positive output terminal of said second rectifier, a cold cathode gas filled constant voltage device having an anode and a cathode, means having inductive reactance and resistance connecting the positive terminal of said first rectifier to said anode and means for connecting said cathode to the negative terminal of said second rectifier, a varistor having a first terminal connected to said anode, a first resistor having a first terminal connected to said cathode, the other terminal of said varistor and the other terminal of said resistor being conductively connected to form a common terminal, said varistor being poled so that current flows through it in its forward or low resistance direction when said anode is positive with respect to the potential of said common terminal, a second resistor, a current path comprising said fourth winding and said second resistor in series connected to the output terminals of said first rectifier, a third core of magnetic material having two outer legs and a middle leg, a sixth and a seventh winding on said outer legs respectively of said third core, an eighth winding on the middle leg of said third core, means for connecting one terminal of said eighth winding to said common terminal, means for connecting the other terminal of said eighth winding through a variable portion of said second resistor to the positive terminal of said second rectifier, a second transformer having a primary winding connected to said supply source and a secondary winding, a third and a fourth rectifying element, a third resistor, means comprising said third resistor for connecting a mid-terminal of said secondary winding of said second transformer to one terminal of said fifth winding, means for connecting one end terminal of the secondary winding of said second transformer through said sixth winding and through said third rectifying element in its forward direction to said other terminal of said fifth winding, means for connecting the other end terminal of the secondary winding of said second transformer through said seventh winding and through said fourth rectifying element to said other terminal of said fifth winding, and a condenser in a current path connecting said mid-terminal and said other terminal of said fifth winding, the magnetomotive forces set up by the currents supplied to said sixth and seventh windings being opposed in a magnetic circuit comprising the outer legs of said third core, the magnetomotive forces set up by the currents supplied to said second and third windings being opposed in a magnetic circuit comprising the outer legs of said second core and the magnetomotive forces set up by the currents supplied to said fourth and fifth windings in the middle leg of said second core being opposed.

6. Apparatus for supplying to a load having a high power factor which may be substantially unity from an alternating-current supply source the voltage of which may vary over a range from a certain minimum to a certain maximum voltage current having a certain maximum root-mean-square value comprising an autotransformer having a core forming a flux path partly of magnetic material and partly of a series gap or gaps devoid of magnetic material and having a winding on said core comprising a first and a second winding portion, means for connecting said first winding portion in series with said load and said supply source, a variable inductive reactor, means comprising said variable reactor for supplying current from said supply source to said second winding portion to thereby increase the voltage across said load to a voltage at least as large as the maximum voltage of said supply source, said reactor having a control winding to which a control current may be supplied for controlling the reactance of said reactor, and means for supplying to said control winding a control current having variations corresponding to load voltage changes for minimizing said load voltage changes, said gap or gaps having sufficient length that the relationship between the current supplied to said second winding portion of said autotransformer and the difference of said load voltage and said supply voltage is substantially rectilinear over the entire range of supply voltage for a predetermined load current not greater than said maximum load current.

References Cited in the file of this patent

UNITED STATES PATENTS 2,469,280     Scott  ---------------- May 3, 1949